United States Patent
Ito et al.

(10) Patent No.: US 9,651,722 B2
(45) Date of Patent: May 16, 2017

(54) OPTICAL SYSTEM AND OPTICAL APPARATUS

(71) Applicant: CANON KABUSHIKI KAISHA, Tokyo (JP)

(72) Inventors: Satoshi Ito, Utsunomiya (JP); Hironobu Koga, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/014,626

(22) Filed: Feb. 3, 2016

(65) Prior Publication Data
US 2016/0231479 A1    Aug. 11, 2016

(30) Foreign Application Priority Data
Feb. 6, 2015  (JP) .................. 2015-021965

(51) Int. Cl.
| | |
|---|---|
| G02B 9/08 | (2006.01) |
| G02B 5/22 | (2006.01) |
| G02B 5/20 | (2006.01) |
| G03B 11/00 | (2006.01) |
| G03B 9/02 | (2006.01) |
| G03B 17/14 | (2006.01) |

(52) U.S. Cl.
CPC ............... *G02B 5/20* (2013.01); *G03B 9/02* (2013.01); *G03B 11/00* (2013.01); *G03B 17/14* (2013.01)

(58) Field of Classification Search
CPC ...... G02B 5/003; G02B 5/005; G02B 5/0278; G02B 5/22; G02B 5/20; G02B 5/205
USPC ........................................ 359/738, 739, 888
See application file for complete search history.

(56) References Cited

U.S. PATENT DOCUMENTS 3,843,235 A * 10/1974 Mino .................. G02B 27/40
                                                     359/738
2014/0293468 A1    10/2014 Mikami et al.

FOREIGN PATENT DOCUMENTS

| JP | 05-145938 A | 6/1993 |
|---|---|---|
| JP | 09-236740 A | 9/1997 |
| JP | 2014-211617 A | 11/2004 |
| JP | 2005-062732 A | 3/2005 |

* cited by examiner

*Primary Examiner* — William Choi
(74) *Attorney, Agent, or Firm* — Carter, DeLuca, Farrell & Schmidt, LLP

(57) ABSTRACT

An optical system includes a plurality of lenses, a diaphragm configured to adjust a light amount, and an optical element having a transmittance distribution. A transmittance of the optical element satisfies predetermined conditions. In addition, another predetermined condition is satisfied when the diaphragm is fully opened.

7 Claims, 8 Drawing Sheets

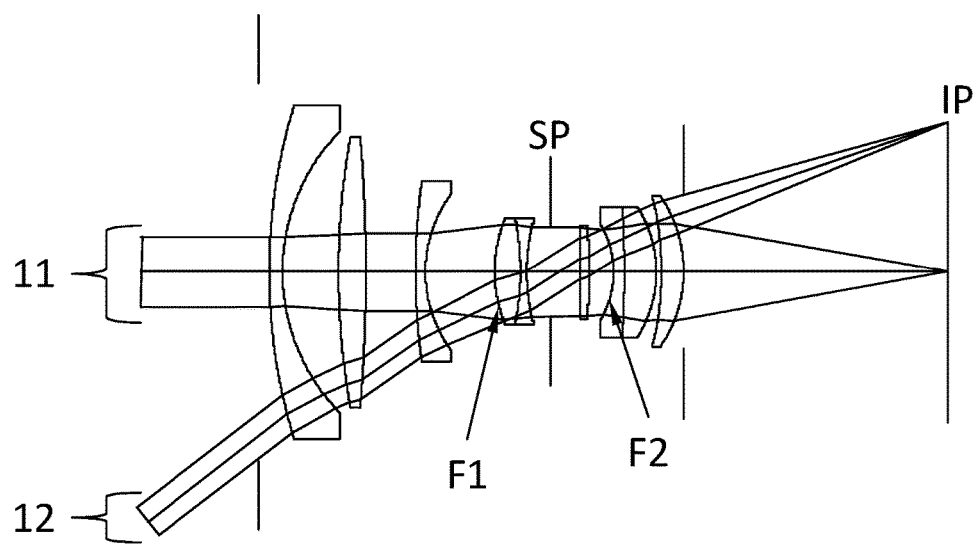
FIG. 11
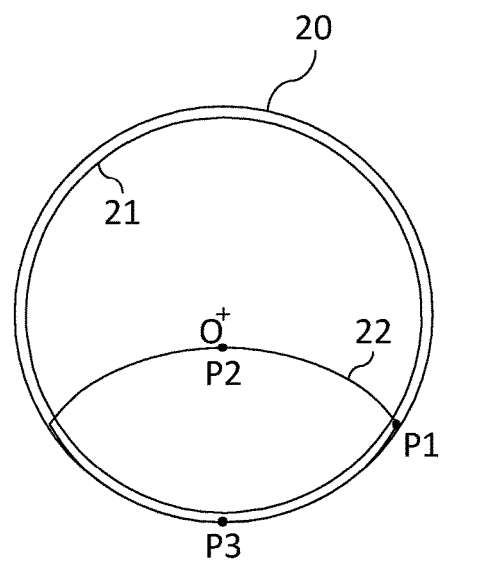
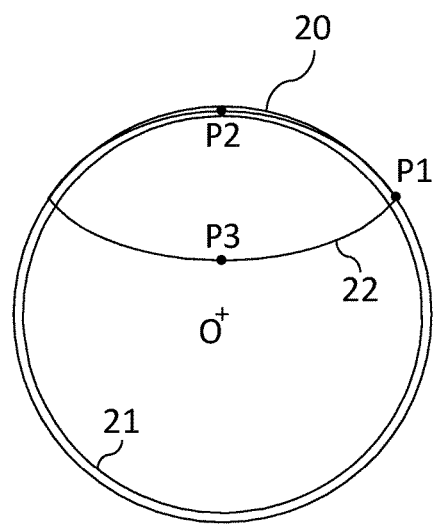
FIG. 12A     FIG. 12B

OPTICAL SYSTEM AND OPTICAL APPARATUS

BACKGROUND OF THE INVENTION

Field of the Invention

The present invention relates to an optical system and an optical apparatus.

Description of the Related Art

In general, the optical performance of the image pickup optical system is evaluated based on the imaging performance of a focused object. However, depending on applications, an appearance of a defocused image may be an important evaluation factor for the optical performance of the image pickup optical system. In particular, in an image pickup optical system used for an image pickup apparatus, such as a film-based camera, a digital camera using a semiconductor image sensor, a video camera, and a TV camera, it is likely that the appearance of the defocused image is regarded as more important.

Japanese Patent Laid-Open No. ("JP") 9-236740 proposes an image pickup lens system that includes an apodization ("APD") filter located near a diaphragm. This lens system changes a length in at least one lens unit, and entirely moves to the object side in focusing from an infinity in-focus state to a short-distance in-focus state.

In general, in image pickup optical systems from a wide angel end to an intermediate telephoto end, the sagittal halo of an off-axis light flux causes an uneven intensity of the defocused image in the image periphery, and the ADP filter is effective to removing the sagittal halo. However, the APD filter disclosed in JP 9-236740 is configured so that its transmittance distribution gradually decreases as a distance from the optical axis increases in a direction perpendicular to the optical axis and forms an approximately Gaussian distribution. Therefore, the transmission of light near the light flux center other than the sagittal halo also decreases. As a result, a light amount drops disadvantageously.

SUMMARY OF THE INVENTION

The present invention provides an optical system and an image pickup apparatus that can improve an appearance of a defocused image while restraining a drop of a light amount of a defocused image.

The optical system according to the present invention includes a plurality of lenses, a diaphragm configured to adjust a light amount, and an optical element having a transmittance distribution. A transmittance of the optical element decreases as a distance increases from an optical axis of the optical element in a radial direction in a range of $r_1 < r$, and the following conditional expressions are satisfied in a range of $0 \leq r \leq r_1$ $$0.9 \leq T(r)/T_0; \text{ and}$$

$$0.5 \leq r_1/r_a,$$

where r is a distance in the radial direction from the optical axis of the optical element, $r_1$ is a distance in the radial direction from the optical axis to a position at which the transmittance of the optical element has a value of 90% of a maximum value, $T(r)$ is the transmittance at a position having the distance r, $T_0$ is the maximum value of the transmittance, and $r_a$ is an effective diameter of the optical element. The following conditional expression is satisfied:

$$(OP2OP3)/2r_a \leq r_2/r_a \leq OP1/r_a$$

when the diaphragm is fully opened, $r_2$ is a distance in the radial direction from the optical axis to a position at which the transmittance of the optical element has a value of 50% of the maximum value. P1 is an end point in an incident area of a most off-axis light flux in the optical element. P2 is a top end of the incident area. P3 is a bottom end of the incident area. OPi is a distance between the optical axis and a point corresponding to Pi (i=1, 2, 3) projected onto a plane perpendicular to the optical axis.

Further features of the present invention will become apparent from the following description of exemplary embodiments with reference to the attached drawings.

BRIEF DESCRIPTION OF THE DRAWINGS

FIG. 11 is a sectional view of an image pickup optical system according to a fourth embodiment of the present invention.

FIGS. 12A and 12B are views illustrating incident areas of an axial light flux and the most off-axis light flux on a transmittance distribution element in the image pickup optical system illustrated in FIG. 11 according to the fourth embodiment.

DESCRIPTION OF THE EMBODIMENTS

Figure 15:
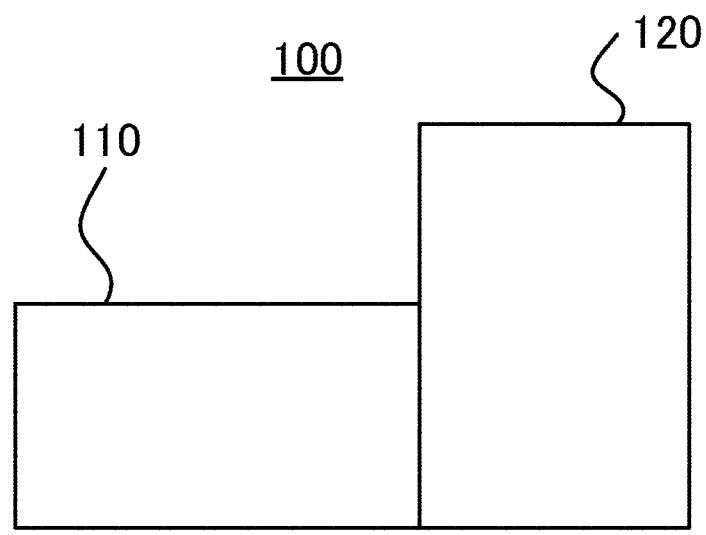
FIG. 15 is a block diagram of an image pickup system according to this embodiment.

FIG. 15 is a block diagram of an image pickup system (optical apparatus) 100 according to this embodiment. The image pickup system includes an interchangeable lens (optical apparatus) 110, and an image pickup apparatus 120. The interchangeable lens 110 is interchangeably attached to and detached from the image pickup apparatus 120. The interchangeable lens 110 includes an optical system according to this embodiment. The image pickup apparatus 120 is, for example, an image pickup apparatus, such as a film-based camera, a digital camera using a semiconductor image sensor, a video camera, and a TV camera, and may be a single-lens reflex camera and a single-lens non-reflex camera. Since the present invention is applicable to a lens integrated type image pickup apparatus, the optical apparatus may serve as an image pickup apparatus. Alternatively, the optical system of this embodiment is applicable to another optical apparatus, such as a microscope and a projection type display apparatus. A description will now be given of an optical system according to this embodiment using an image pickup optical system provided in the interchangeable lens 110 as an example.

The image pickup optical system is applicable to image pickup of a three-dimensional object. The "three-dimensional object," as used herein, is an object that includes a plurality of parts having different distances in the optical axis direction, and in particular an object having a point distant from a focal plane of the image pickup optical system by a depth of field or longer at the image pickup time.

At this time, a defocused image is formed on an image plane. When a diameter of the defocused image is larger than a radius of an image circle by about 1-2% or more, the defocused image can be recognized. The "image circle," as used herein, means a circle in which light passing through an effective diameter of the lens forms an image. When the optical system according to this embodiment is applied to the image pickup optical system in a digital still camera or a video camera, the image plane is an image pickup plane of a semiconductor image sensor (photoelectric conversion element) such as a CCD sensor or a CMOS sensor. When the optical system of this embodiment is applied to the image pickup optical system in a film-based camera, the image pickup plane is a film plane. The radius of the image circle may be a maximum image height of the image pickup plane or film plane in the image pickup apparatus.

The optical system of this embodiment includes a transmittance distribution element that provides a transmittance distribution to light of each angle of view, and is configured to change a light amount distribution of the defocused image. Since the defocused image that has a large light amount in the outer circumference has an intensified contour, the transmittance of the periphery of the defocused image may be lower than that of the central part. The following description assumes that the transmittance distribution element has a centrally symmetrical transmittance distribution, and the transmittance at the periphery is lower than that of the center part.

The image pickup optical system includes a plurality of lenses, a diaphragm configured to adjust a light amount, and a transmittance distribution element.

The transmittance distribution element is an optical element having a transmittance distribution, and is obtained by evaporating an absorption material or a reflection material onto a transparent glass flat plate and a lens surface so as to provide a predetermined transmittance distribution, or by applying and exposing a photosensitive material so as to provide a predetermined density. A concave lens made of a light absorbing material (ND glass) may be used. The transmittance distribution may be variable using an electro chromic material, etc.

Figure 1:
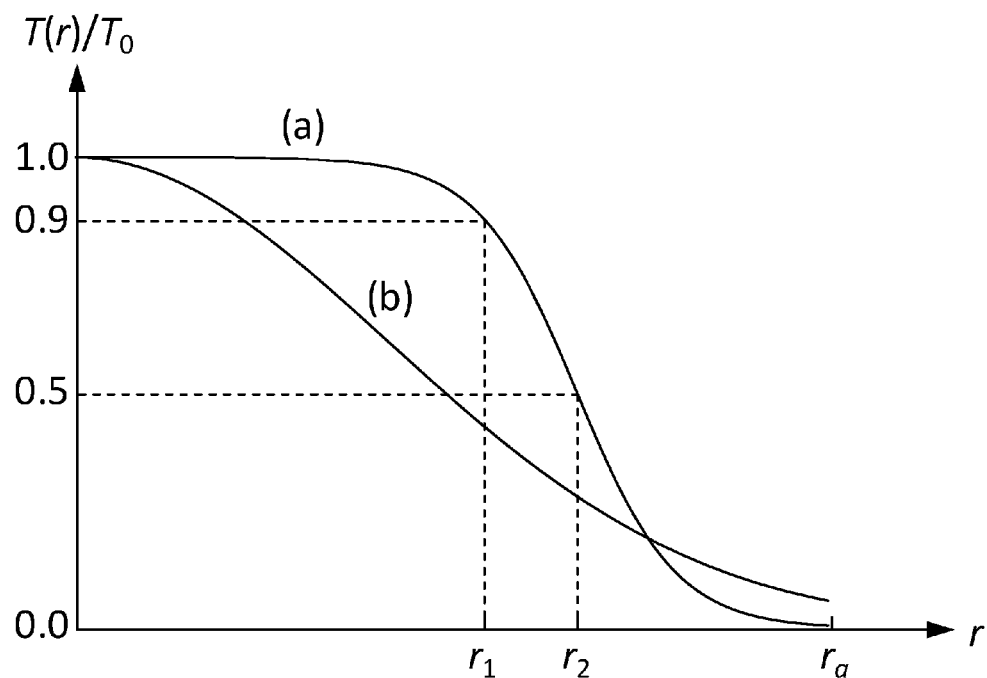
FIG. 1 illustrate transmittance distributions of a transmittance distribution element according to this embodiment and a general apodization (APD) element.

FIG. 1 is a graph illustrating (a) a transmittance distribution of the transmittance distribution element according to this embodiment, and (b) a transmittance distribution of a general APD element. In FIG. 1, an abscissa axis denotes a distance r from the optical axis in a radial direction. The radial direction is a direction from the optical axis to the outside on a plane perpendicular to the optical axis. The ordinate axis denotes $T(r)/T_0$. $T(r)$ represents the transmittance at a position having a distance r, and $T_0$ is the maximum value of the transmittance (maximum transmittance) in the effective diameter. The effective diameter is an aperture diameter of the optical element through which light can pass. In addition, $r_1$ is a distance in the radial direction from the optical axis to a position at which the transmittance of the transmittance distribution element has a value of 90% of the maximum transmittance, and $r_2$ is a distance in the radial direction from the optical axis to a position at which the transmittance of the transmittance distribution element has a value of 50% of the maximum transmittance.

The image pickup optical system that includes the Gaussian distribution type transmittance distribution element illustrated by (b) in FIG. 1 near the diaphragm can remove the sagittal halo that causes the uneven intensity of the defocused image, and improve the appearance of the defocused image. However, the Gaussian distribution type transmittance distribution provides the transmittance reducing effect even to light that passes near the center and is irrelevant to the uneven intensity of the defocused image, decreasing the light amount of the defocused image and reducing the resultant size of the defocused image.

Accordingly, this embodiment uses the transmittance distribution element illustrated by (a) in FIG. 1 to improve the appearance of the defocused image while restraining the drop of the light amount near the center of the light flux.

In a general image pickup optical system, an off-axis light flux suffers vignetting. The "vignetting" means shielding of part of light. In the image pickup optical system causing the vignetting, a light passing area in the diaphragm is different between the on-axis light flux and the off-axis light flux, and the effect obtained by the transmittance distribution element differs according to angles of view. In general, the off-axis light flux passes a narrower range than the on-axis light flux, and thus the transmittance distribution adjusted to the on-axis light flux does not always fit the off-axis light flux. When the transmittance distribution element is distant from the diaphragm, the center of the off-axis light flux shifts from the optical axis. As a result, the transmittance of the off-axis light flux becomes asymmetrical when the transmittance distribution element has a centrally symmetrical transmittance distribution.

This embodiment addresses the fact that a shape of the off-axis light flux becomes upside down between a position on the object side of the diaphragm and a position on the image side of the diaphragm, and provides at least one transmittance distribution element near the diaphragm. This configuration can equivalently achieve an approximately centrally symmetrical pupil transmittance distribution of the off-axis light flux. When the defocused image improving effect at the off-axis angle of view is regarded as important, the optical element having the transmittance distribution is disposed near the diaphragm. Thereby, the APD effect that is effective even to the off-axis light flux can be obtained.

Assume that r is a distance in the radial direction that is perpendicular to the optical axis of the transmittance distribution, from the center which the optical axis of the transmittance distribution element passes, and $r_1$ is a value of r with which the transmittance of the transmittance distribution element has a value of 90% of the maximum transmittance in the effective diameter. Then, the transmittance decreases as a distance increases from the optical axis in the radial direction in a range outside of $r_1$ ($r_1 < r$). In addition, the following conditional expression (1) is satisfied in another range ($0 \le r \le r_1$):

$$0.9 \le T(r)/T_0 \quad (1)$$

Moreover, $r_1$ satisfies the following conditional expression (2).

$$0.5 \le r_1/r_a \quad (2)$$

Herein, T(r) is a transmittance at a position with the distance r from the center in the radial direction, $T_0$ is the maximum transmittance in the effective diameter, and $r_a$ is the effective diameter.

In order to improve the defocused image having a large light amount in the periphery and the emphasized edge, it is necessary to make lower the transmittance in the periphery of the light flux than that at the central part of the light flux. Unless this condition is satisfied, the light amount in the periphery of the light flux is made larger than that at the central part of the light flux, and the defocused image becomes deteriorated because the edge is emphasized. Therefore, the transmittance of the transmittance distribution element can decrease in the periphery as the distance increases from the center in the radial direction.

The conditional expressions (1) and (2) are relate to the shape of the transmittance distribution of the transmittance distribution element. In a certain range from the center, a light amount taken by the lens system can be increased without reducing the transmittance. At the central part of the light flux, the transmittance may be constant in a predetermined range. When the transmittance distribution element is made of the electro chromic material, it is difficult to smoothly change the transmittance distribution. Therefore, the transmittance may be changed stepwise.

When the value is lower than the lower limit of the conditional expression (1), the transmittance becomes too low near the center of the transmittance distribution element, and a light amount of the defocused image formed near the center on the image plane becomes lower. When the value is lower than the lower limit of the conditional expression (2), an area becomes too narrow, in which the transmittance is high near the center of the transmittance distribution element, and a light amount drops near the center of the defocused image. Due to the manufacture scattering, the point that provides the highest transmittance may shift from the optical axis or the transmittance distribution may become uneven. In these cases, unless the transmittance error falls within a range from 5% to 10%, the defocused image becomes deteriorated.

A description will now be given of suitable conditions for this embodiment.

Assume that when the diaphragm is fully opened, $r_2$ is a distance in the radial direction from the optical axis to a position at which the transmittance of the transmittance distribution element has a value of 50% of the maximum transmittance $T_0$. O is the optical axis or the center of the transmittance distribution element. In the transmittance distribution element, P1 is an end point of an incident area of the most off-axis light flux, P2 is a top end of the incident area, and P3 is a bottom end of the incident area. Then, the following conditional expression may be satisfied:

$$(OP2+OP3)/2r_a \le r_2/r_a \le OP1/r_a \quad (3)$$

Herein, OPi is a distance between a point corresponding to the point O and a point corresponding to Pi (i=1, 2, 3) projected onto a plane perpendicular to the optical axis.

The conditional expression (3) relates to the shape of the transmittance distribution of the transmittance distribution element. When the value is lower than the lower limit of the conditional expression (3), an area becomes too wide, in which the transmittance becomes lower than 50% of the maximum transmittance $T_0$. This configuration removes the light other than the sagittal halo component that causes the uneven intensity of the defocused image, and the light amount of the defocus image becomes excessively low. When the value exceeds the upper limit, the area becomes too narrow, in which the transmittance becomes lower than 50% of the maximum transmittance $T_0$. Thereby, the defocused image improving effect by the transmittance distribution element reduces, and the defocused image has the emphasized edge.

In focusing on infinity, the following conditional expression (4) may be satisfied:

$$10 \text{ mm} \le f/Fno \le 70 \text{ mm} \quad (4a)$$

where f is a focal length of the image pickup optical system, and Fno is an open aperture value.

The conditional expression (4) relates to an incident pupil diameter of the image pickup lens. When the value is lower than the lower limit of the conditional expression (4), an area in which each defocused image occupies becomes too narrow on the image pickup plane. Then, the transmittance distribution given to the defocused image becomes too narrow on the image pickup plane, and the defocused image improving effect by the transmittance distribution element reduces. Since the defocused image is originally small and thus the deterioration of the defocused image is less likely to stand out in the image pickup. When the value exceeds the upper limit of the conditional expression (4), the defocused image becomes large and the area in which each defocused image occupies becomes excessively large on the image pickup plane. While the defocused image having the emphasized edge is formed due to the aberration of the image pickup optical system, the influence of the aberration on the light amount distribution of the defocused image becomes smaller in the large defocused image, in which the value is higher than the upper limit of the conditional expression (4), and the defocused image is less likely to stand out in the image pickup.

The conditional expression (4) may be replaced with the following conditional expression:

$$12 \text{ mm} \le f/Fno \le 70 \text{ mm} \quad (4a)$$

The following conditional expression (5) may be satisfied:

$$9° \le \omega \le 45° \quad (5)$$

where $\omega$ is half an angle of view of the image pickup lens.

The conditional expression (5) relates to half an angle of view of the image pickup lens. While the defocused image having the emphasized edge is formed due to the aberration of the image pickup optical system, a designing effort can restrain the aberration that deteriorates the light amount distribution of the defocused image in the image pickup optical system in which the value is lower than the lower limit of the conditional expression (5). Therefore, the defocused image is less likely to stand out and the effect of the transmittance distribution element reduces. When the value satisfies the lower limit value of the conditional expression (5), the background is likely to cause dot-shaped or thin-line-shaped light sources or objects, because of the background compression effect by the perspective of the image pickup lens. In such an object, the contour of the defocused image is likely to stand out, and the effect of the transmittance distribution element becomes more effective. When the value exceeds the upper limit of the conditional expression (5), the vignetting for the off-axis light flux becomes worse. Then, it becomes difficult to provide defocused image improving effect equally to the on-axis light flux and the off-axis light flux.

In the transmittance distribution element, the following conditional expression may be satisfied:

$$\{(Tmax-Tmin)/Tmax\}\times100(\%)\leq20(\%)$$

where Tmax is the maximum value of the transmittance and Tmin is a minimum value of the transmittance in a wavelength range from 430 nm to 700 nm. This condition relates to a wavelength dispersion of the transmittance. Unless this condition is satisfied, the periphery of the defocused image becomes colored and the defocused image improving effect reduces.

The image pickup optical systems of respective embodiments are illustrated in FIGS. 2, 5, 8, and 11. In these figures, reference numeral 11 represents the on-axis light flux, and reference numeral 12 represents the most off-axis light flux. The "off-axis light flux" is a light flux that forms an image outside of the optical axis, and the "most off-axis light flux" is a light flux that forms an image at the outermost part on the image pickup plane. Each figure representatively illustrates a light flux incident on the image pickup optical system from the lower side of optical axis. SP denotes the diaphragm, and IP denotes the image plane. F1 and F2 denote the transmittance distribution elements.

When the diaphragm is fully opened, the vignetting states of the on-axis light flux and the most off-axis light flux on the transmittance distribution elements are illustrated in FIGS. 3, 6A, 6B, 9, 12A, and 12B. FIGS. 3, 6A, 9, and 12A correspond to a transmittance distribution element F1, and FIGS. 6B and 12B correspond to a transmittance distribution element F2. In each figure, reference numeral 20 denotes an effective diameter of the transmittance distribution element, reference numeral 21 denotes an incident area of the on-axis light flux, and reference numeral 22 denotes an incident area of the most off-axis light flux. O denotes a center position of the transmittance distribution element or the position of the optical axis. P1 is an end point of the incident area 22. P2 is an upper end of the incident area 22, and P3 is a lower end of the incident area 22.

Intensity distributions of the defocused images formed by the image pickup optical systems according to respective embodiments on the image pickup plane are illustrated in FIGS. 4, 7, 10, and 13. The abscissa axis denotes the position R, and the ordinate axis denotes the intensity I(R) at the position R. As illustrated, reference numeral 31 denotes the intensity distribution of the defocused image at the on-axis angle of view when the transmittance distribution element is not provided. Reference numeral 32 denotes the intensity distribution of the defocused image at the on-axis angle of view when the transmittance distribution element is provided. Reference numeral 33 denotes the intensity distribution of the defocused image at the off-axis angle of view when the transmittance distribution element is not provided. Reference numeral 34 denotes the intensity distribution of the defocused image at the off-axis angle of view when the transmittance distribution element is provided. $I_0$ denotes the intensity at the position on the image pickup plane which the principal ray enters. The intensity distribution of the defocused image is evaluated on the section that is perpendicular to the meridional plane and passes the incident position of the principal ray.

Figure 14:
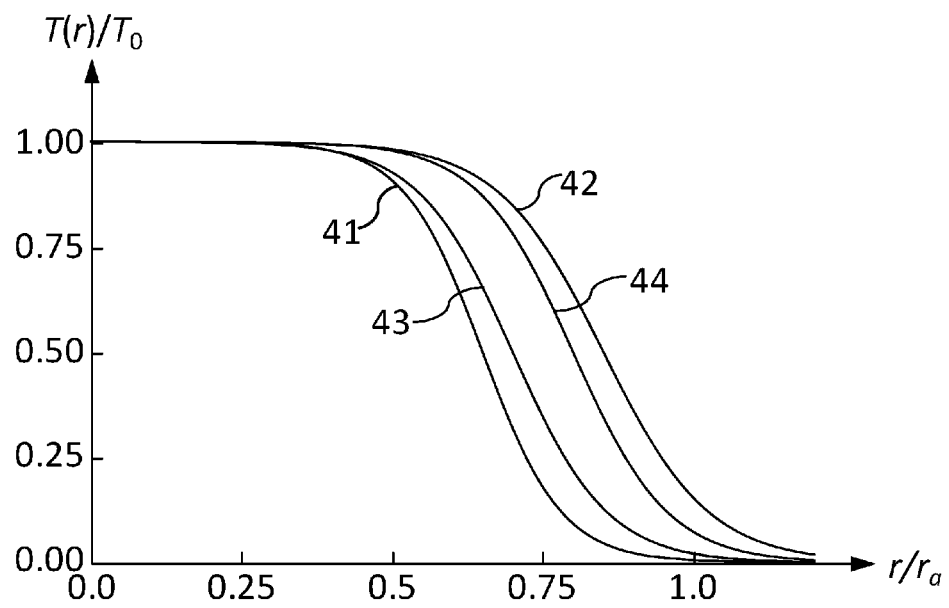
FIG. 14 is a view illustrating transmittance distributions of the transmittance distribution elements according to the first, second, third, and fourth embodiments of the present invention.

FIG. 14 illustrates the transmittance of the transmittance distribution element of each embodiment. The abscissa axis denotes $r/r_a$, and the ordinate axis denotes $T(r)/T_0$.

A detailed description will now be given of each embodiment of the present invention.

First Embodiment

Figure 2:
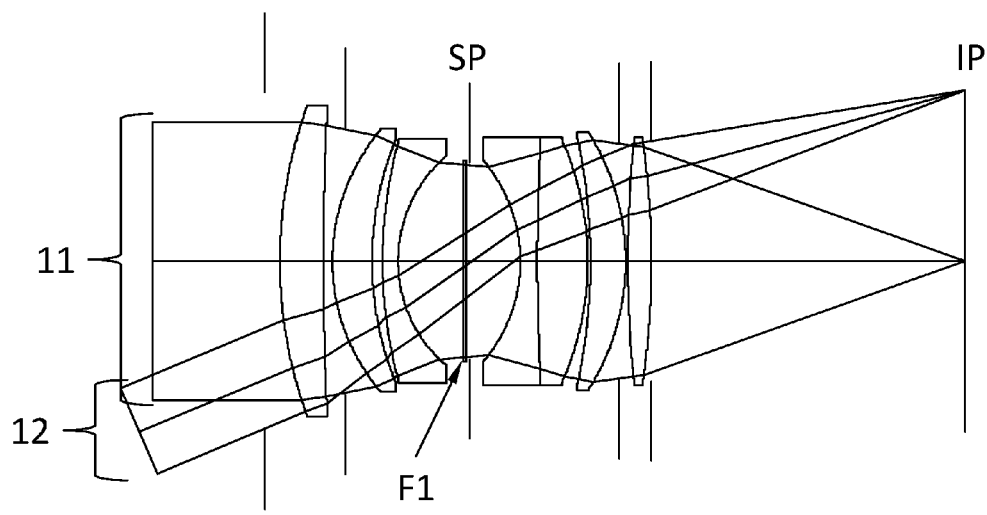
FIG. 2 is a sectional view of an image pickup optical system according to a first embodiment of the present invention.

FIG. 2 is a sectional view of an image pickup optical system according to a first embodiment. A transmittance distribution element F1 is disposed on the front side (object side) near a diaphragm SP. The transmittance distribution element F1 can be formed by evaporating a material onto a transparent glass flat plate. The transmittance distribution element F1 provides a pupil intensity distribution to the light flux of all angles of view containing the on-axis light flux 11 and the most off-axis light flux 12, improving the appearance of the defocused image. In the standard lens, only one transmittance distribution element may be sufficient. This configuration facilitates manufacturing instead of providing a plurality of transmittance distribution elements.

Figure 3:
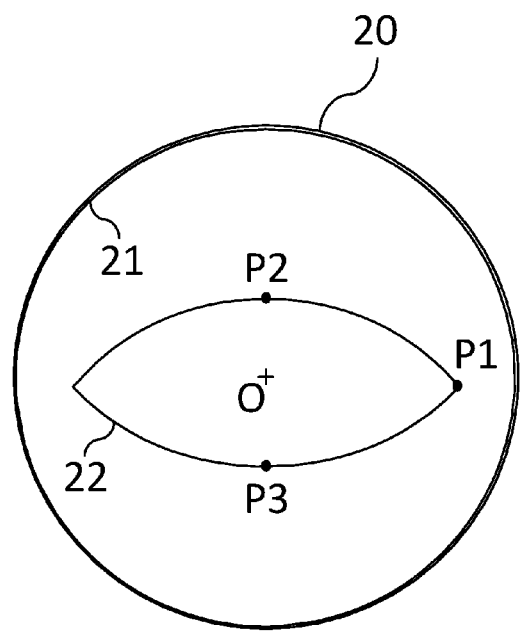
FIG. 3 is a view illustrating incident areas of an on-axis light flux and the most off-axis light flux on a transmittance distribution element in the image pickup optical system illustrated in FIG. 2 according to the first embodiment.

FIG. 3 illustrates vignetting states of the on-axis light flux and the most off-axis light flux in the transmittance distribution element F1. As evident from FIG. 3, the vignetting of the most off-axis light flux can be seen. In order to provide the defocused image improving effect even to the most off-axis light flux, the transmittance distribution element F1 according to the first embodiment possesses the transmittance distribution corresponding to reference numeral 41 illustrated in FIG. 14.

Figure 4:
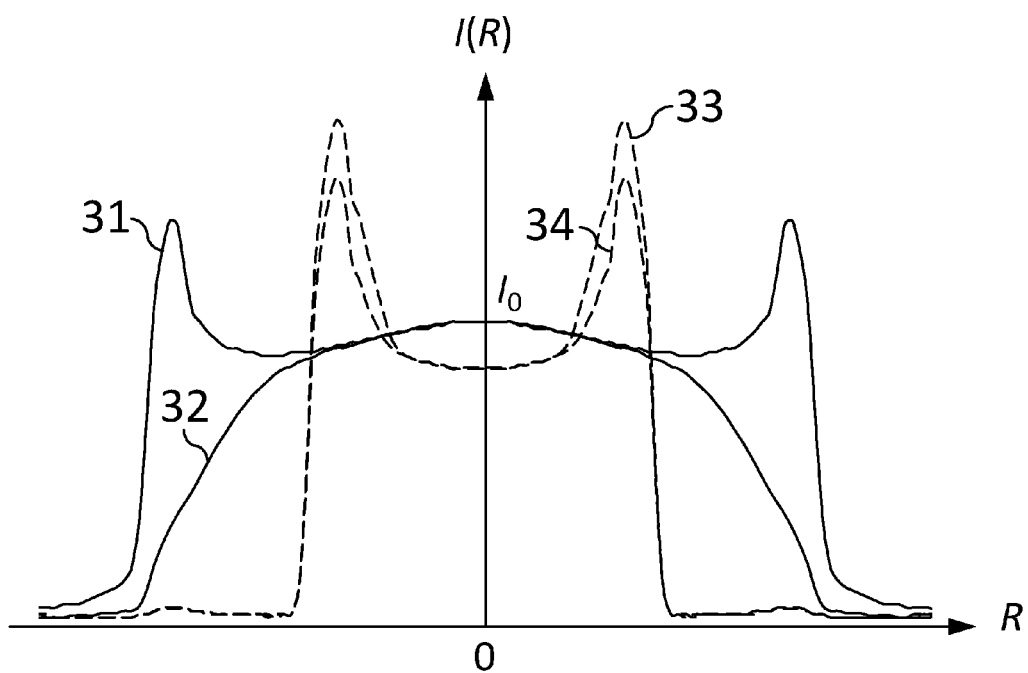
FIG. 4 is a view illustrating an intensity distribution of a defocused image formed by the image pickup optical system illustrated in FIG. 2 according to the first embodiment.

FIG. 4 illustrates intensity distributions of the defocused image at the on-axis angle of view and at the off-axis angle of view with an image height of 18 mm and the axis formed on the image pickup plane. The defocused image is a defocused image of an object distant from the image pickup plane by 235$f$ where f is a focal length of the image pickup optical system, in focusing on a position distant from the image pickup plane by 50$f$. As understood from FIG. 4, the defocused image having a high intensity in the periphery at the off-axis angle of view and thus the emphasized edge is improved as the good defocused image in which the intensity in the periphery is mildly decreased by the transmittance distribution 41. In addition, the APD effect appears at the off-axis angle of view corresponding to the image height of 18 mm, because the intensity at the periphery is decreased without a drop of the intensity near the center.

Thus, the transmittance distribution element F1 according to the first embodiment improves the appearance of the defocused image while restraining the drop of the light amount.

Second Embodiment

Figure 5:
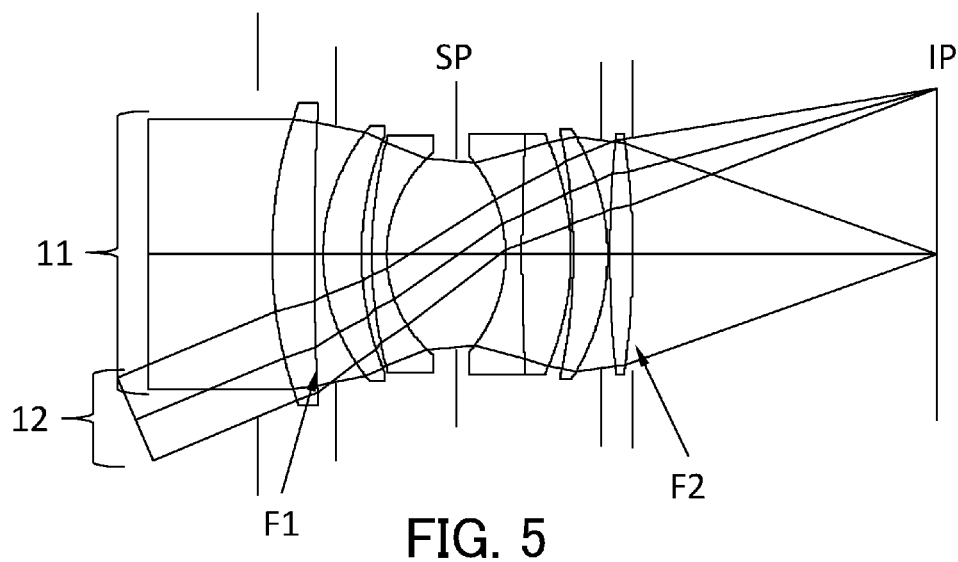
FIG. 5 is a sectional view of an image pickup optical system according to a second embodiment of the present invention.

FIG. 5 is a sectional view of an image pickup optical system according to a second embodiment. A transmittance distribution element F1 is disposed on the object side of the diaphragm, and the transmittance distribution element F2 is disposed on the image side of the diaphragm. In order to equivalently achieve an approximately centrally symmetrical pupil transmittance distribution of the off-axis light flux, the transmittance distribution elements are disposed at two positions (before and after the diaphragm) so that the shape of the off-axis light flux becomes approximately centrally symmetrical. The transmittance distribution element is formed on the lens surface having a curvature so that the lens surface has a transmittance distribution. In other words, the transmittance distribution element F1 is formed on the second lens surface, and the transmittance distribution element F2 is formed on the final lens surface. The transmittance distribution elements F1 and F2 provide the pupil intensity distribution to the light fluxes of all angles of view containing the on-axis light flux 11 and the most off-axis light flux 12, improving the appearance of the defocused image.

Figure 6A:
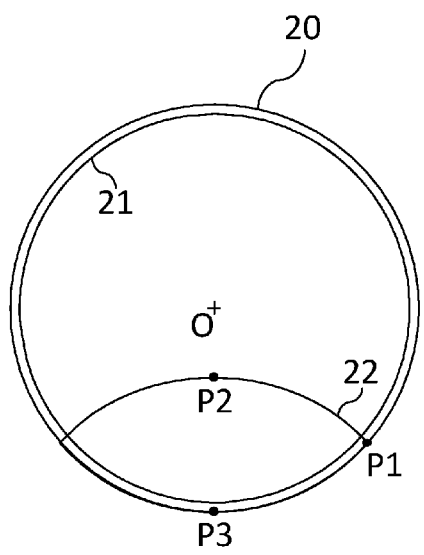
FIGS. 6A and 6B are views illustrating incident areas of an axial light flux and the most off-axis light flux on a transmittance distribution element in the image pickup optical system illustrated in FIG. 5 according to the second embodiment.
Figure 6B:
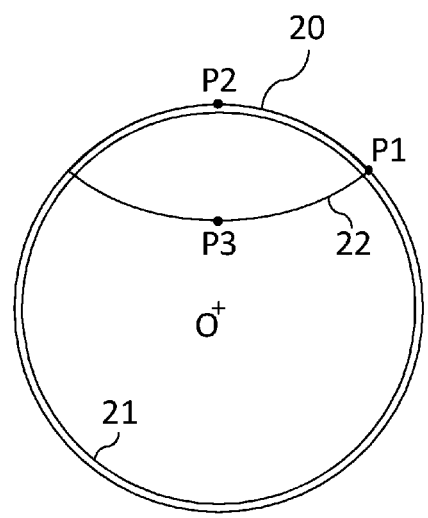

FIGS. 6A and 6B illustrate vignetting states of the on-axis light flux and the most off-axis light flux in the transmittance distribution element. As evident from FIGS. 6A and 6B, the vignetting of the off-axis light flux is seen. In order to provide the defocused image improving effect even to the most off-axis light flux, the transmittance distribution elements F1 and F2 according to the second embodiment have the transmittance distribution corresponding to reference numeral 42 illustrated in FIG. 14.

Figure 7:
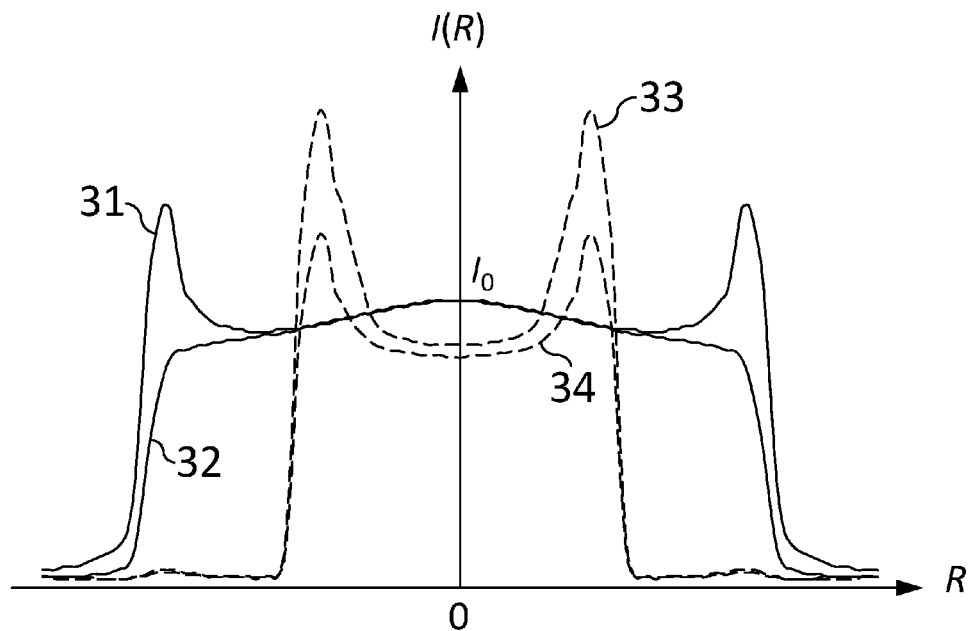
FIG. 7 is a view illustrating an intensity distribution of a defocused image formed by the image pickup optical system illustrated in FIG. 5 according to the second embodiment.

FIG. 7 illustrates intensity distributions of the defocused image at the on-axis angle of view and at the off-axis angle of view with an image height of 18 mm and the axis formed on the image pickup plane. Assume that f is a focal length of the image pickup optical system. Then, the defocused image is a defocused image of an object distant from the image pickup plane by $235f$ in focusing on a position distant from the image pickup plane by $50f$. As evident from FIG. 7, the defocused image having a high intensity in the periphery at the off-axis angle of view and thus the emphasized edge is improved as the good defocused image in which the intensity in the periphery is decreased by the transmittance distribution 42. In addition, the APD effect appears at the off-axis angle of view corresponding to the image height of 18 mm, because the intensity difference between the central part and the periphery is decreased. The appearance of the defocused image of the off-axis light flux according to this embodiment is more improved than that according to the first embodiment, since the defocused image improving effect to the off-axis light flux is regarded as important and the transmittance distribution element is located near the diaphragm. At this time, no intensity drop near the center at the on-axis angle of view.

Thus, the transmittance distribution elements F1 and F2 according to the second embodiment improve the appearance of the defocused image while restraining the drop of the light amount.

Third Embodiment

Figure 8:
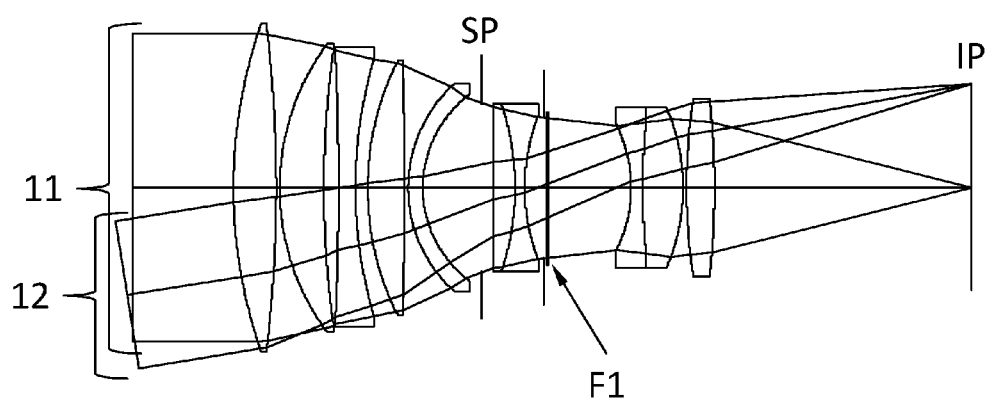
FIG. 8 is a sectional view of an image pickup optical system according to a third embodiment of the present invention.

FIG. 8 is a sectional view of an image pickup optical system according to a third embodiment. A transmittance distribution element F1 is disposed on the image side of the diaphragm SP. The transmittance distribution element F1 can be formed by evaporating a material onto a transparent glass flat plate. The transmittance distribution element F1 can provide a pupil intensity distribution to the light flux of all angles of view containing the on-axis light flux 11 and the most off-axis light flux 12, improving the appearance of the defocused image.

Figure 9:
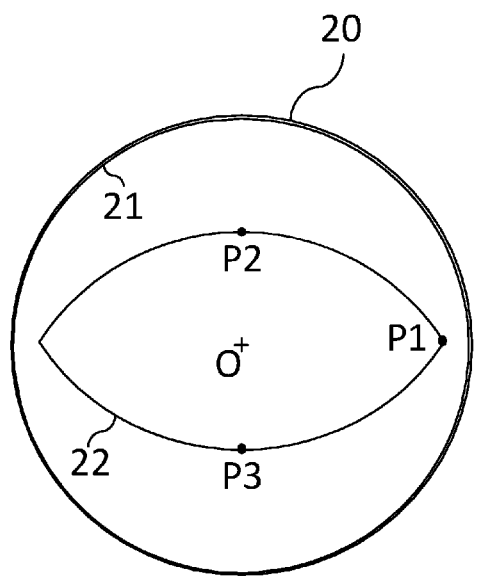
FIG. 9 is a view illustrating incident areas of an axial light flux and the most off-axis light flux on a transmittance distribution element in the image pickup optical system illustrated in FIG. 8 according to the third embodiment.

FIG. 9 illustrates vignetting states of the on-axis light flux and the most off-axis light flux in the transmittance distribution element. As evident from FIG. 9, the vignetting of the most off-axis light flux can be seen. In order to provide the defocused image improving effect even to the most off-axis light flux, the transmittance distribution element F1 according to the third embodiment is provided with the transmittance distribution corresponding to reference numeral 43 illustrated in FIG. 14.

Figure 10:
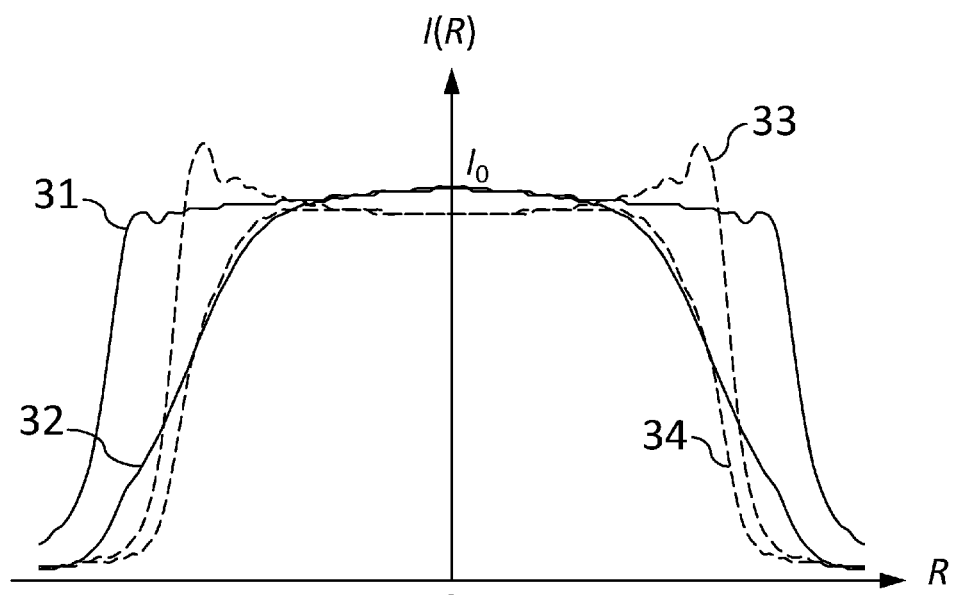
FIG. 10 is a view illustrating an intensity distribution of a defocused image formed by the image pickup optical system illustrated in FIG. 8 according to the third embodiment.

FIG. 10 illustrates intensity distributions of the defocused image at the on-axis angle of view and at the off-axis angle of view formed on the image pickup plane. The defocused image is a defocused image of an object distant from the image pickup plane by $90f$ where f is a focal length of the image pickup optical system, in focusing on a position distant from the image pickup plane by $50f$. The image pickup optical system according to the third embodiment can form comparatively good defocused image even without the transmittance distribution element, but can further improve the defocused image at the on-axis angle of view and at the off-axis angle of view using the transmittance distribution 43, in which the intensity in the periphery is mildly decreased. At this time, no intensity drops near the center.

Thus, the transmittance distribution element F3 according to the third embodiment improves the appearance of the defocused image while restraining the drop of the light amount.

Fourth Embodiment

FIG. 11 is a sectional view of an image pickup optical system according to a fourth embodiment. A transmittance distribution element F1 is disposed on the object side of the diaphragm, and the transmittance distribution element F2 is disposed on the image side of the diaphragm. In order to equivalently achieve an approximately centrally symmetrical pupil transmittance distribution of the off-axis light flux, the transmittance distribution elements are disposed at two positions (before and after the diaphragm) so that the off-axis light flux becomes approximately centrally symmetrical. The transmittance distribution element is formed on the lens surface having a curvature so that the lens surface has a transmittance distribution. The transmittance distribution elements F1 and F2 provide the pupil intensity distribution to the light fluxes of all angles of view containing the on-axis light flux 11 and the most off-axis light flux 12, improving the appearance of the defocused image.

FIGS. 12A and 12B illustrate vignetting states of the on-axis light flux and the most off-axis light flux in the transmittance distribution elements. As evident from FIGS. 12A and 12B, the vignetting of the off-axis light flux can be seen. In order to provide the defocused image improving effect even to the most off-axis light flux, the transmittance distribution elements F1 and F2 according to the fourth embodiment possess the transmittance distribution corresponding to reference numeral 44 illustrated in FIG. 14.

Figure 13:
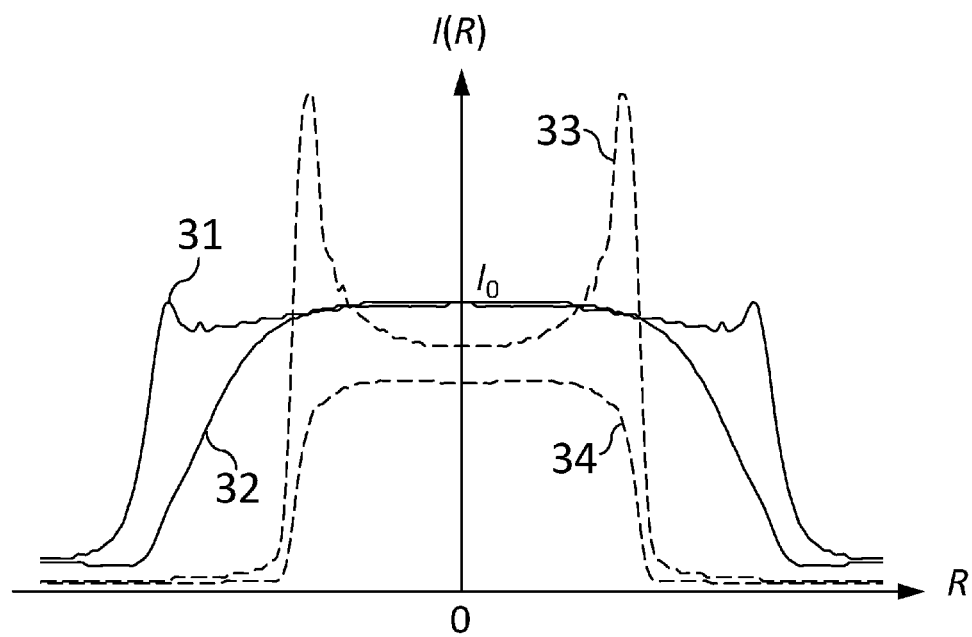
FIG. 13 is a view illustrating an intensity distribution of a defocused image formed by the image pickup optical system illustrated in FIG. 11 according to the fourth embodiment.

FIG. 13 illustrates intensity distributions of the defocused image at the on-axis angle of view and at the off-axis angle of view formed on the image pickup plane. Assume that f is a focal length of the image pickup optical system. Then, the defocused image is a defocused image of an infinity object in focusing on a position distant from the image pickup plane by $16f$. As evident from FIG. 13, the defocused image having a high intensity in the periphery at the off-axis angle of view and thus the emphasized edge is improved as the good defocused image in which the intensity in the periphery is mildly decreased by the transmittance distribution 44. At this time, no drop of intensity near the center occurs at the on-axis angle of view.

Thus, the transmittance distribution elements F1 and F2 according to the fourth embodiment improve the appearance of the defocused image while restraining the drop of the light amount.

Next follows numerical examples 1 to 4 corresponding to the first to fourth embodiments. In each numerical example, "r" denotes a radius of curvature (mm) of an i-th plane from the object side, and "d" denotes a surface distance (mm) along the optical axis between the i-th surface and the (i+1)-th surface from the object side. "nd" and "vd" denote a refractive index and an Abbe number of the d-line of the optical element. The focal length f (mm), the F-number Fno, and the angle of view ω (degree) are values when the infinity object is focused. BF denotes a back focus, and the lens overall length is a distance from the first plane to the image plane. "*" after the surface number denotes an aspheric surface. An aspheric shape is expressed by a displacement amount X from a surface vertex in the optical axis direction and a height h from the optical axis in the direction perpendicular to the optical axis, a paraxial radius of curvature r, a conical constant K, and aspheric coefficients A4, A6, A8, and A10:

The lens unit includes at least one lens. When the lens unit includes a plurality of lenses, one movable lens unit is a unit that integrally moves during zooming or focusing.

$$X(h) = \frac{h^2/r}{1+\sqrt{1-(1+K)(h/r)^2}} + A4h^4 + A6h^6 + A8h^8 + A10h^{10}$$

"e±Z" means "$10^{\pm Z}$."

Numerical Example 1

Unit: mm

Surface data

| Surface No. | r | d | nd | vd | effective diameter |
|---|---|---|---|---|---|
| 1 | ∞ | 2.00 | | | 42.78 |
| 2 | 55.776 | 5.50 | 1.77250 | 49.6 | 38.04 |
| 3 | 359.778 | 2.80 | | | 36.09 |
| 4 | ∞ | −1.60 | | | 33.81 |
| 5 | 25.999 | 5.00 | 1.83481 | 42.7 | 31.97 |
| 6 | 42.223 | 1.20 | | | 29.70 |
| 7 | 57.641 | 2.00 | 1.64769 | 33.8 | 29.56 |
| 8 | 17.674 | 8.40 | | | 25.24 |
| 9 | ∞ | 0.50 | 1.51633 | 64.1 | 24.55 |
| 10 | ∞ | 0.10 | | | 24.55 |
| 11(diaphragm) | ∞ | 6.50 | | | 24.55 |
| 12 | −19.386 | 2.00 | 1.80518 | 25.4 | 24.15 |
| 13 | 257.965 | 6.50 | 1.75700 | 47.8 | 28.14 |
| 14 | −38.043 | 0.20 | | | 29.83 |
| 15 | −71.655 | 4.50 | 1.88300 | 40.8 | 30.67 |
| 16 | −30.457 | −0.80 | | | 31.22 |
| 17 | ∞ | 1.00 | | | 30.14 |
| 18 | 123.258 | 3.00 | 1.80400 | 46.6 | 29.66 |
| 19 | −104.699 | 0.00 | | | 30.02 |
| 20 | ∞ | 0.00 | | | 30.32 |
| 21 | ∞ | (variable) | | | 30.32 |
| image plane | ∞ | | | | | various data

| zooming ratio | 1.00 |
|---|---|
| focal length | 52.46 |
| Fno | 1.48 |
| angle of view | 22.41 |
| image height | 21.64 |
| lens overall length | 88.50 |
| BF | 39.70 |
| d21 | 39.70 |
| incident pupil position | 30.74 |
| exit pupil position | −34.08 |
| front principal position (FPP) | 45.90 |
| back principal position (BPP) | −12.76 | zoom lens unit data

| Unit | starting plane | focal length | lens overall length | FPP | BPP |
|---|---|---|---|---|---|
| 1 | 1 | 52.46 | 8.80 | 45.90 | −12.76 | single lens data

| lens | starting plane | focal length |
|---|---|---|
| 1 | 1 | 84.78 |
| 2 | 5 | 71.09 |
| 3 | 7 | −40.14 |
| 4 | 9 | 0.00 |
| 5 | 12 | −22.32 |
| 6 | 13 | 44.21 |
| 7 | 15 | 57.07 |
| 8 | 18 | 70.83 |

Numerical Example 2

Unit: mm

Surface data

| Surface No. | r | d | nd | vd | effective diameter |
|---|---|---|---|---|---|
| 1 | ∞ | 2.00 | | | 42.78 |
| 2 | 57.520 | 5.50 | 1.77250 | 49.6 | 38.04 |
| 3 | 395.282 | 2.80 | | | 36.09 |
| 4 | ∞ | −1.60 | | | 33.81 |
| 5 | 25.921 | 5.00 | 1.83481 | 42.7 | 31.97 |
| 6 | 43.002 | 1.20 | | | 29.70 |
| 7 | 59.016 | 2.00 | 1.64769 | 33.8 | 29.56 |
| 8 | 17.697 | 9.00 | | | 25.24 |
| 9(diaphragm) | ∞ | 6.50 | | | 24.55 |
| 10 | −19.448 | 2.00 | 1.80518 | 25.4 | 24.15 |
| 11 | 280.464 | 6.50 | 1.75700 | 47.8 | 28.14 |
| 12 | −37.481 | 0.20 | | | 29.83 |
| 13 | −74.530 | 4.50 | 1.88300 | 40.8 | 30.67 |
| 14 | −30.712 | −0.80 | | | 31.22 |
| 15 | ∞ | 1.00 | | | 30.14 |
| 16 | 124.396 | 3.00 | 1.80400 | 46.6 | 29.66 |
| 17 | −111.454 | 0.00 | | | 30.02 |
| 18 | ∞ | 0.00 | | | 30.32 |
| 19 | ∞ | (variable) | | | 30.32 |
| image plane | ∞ | | | | | various data

| zooming ratio | 1.00 |
|---|---|
| focal length | 52.50 |
| Fno | 1.49 |
| angle of view | 22.40 |
| image height | 21.64 |
| lens overall length | 88.49 |
| BF | 39.69 |
| d19 | 39.69 |
| incident pupil position | 30.97 |
| exit pupil position | −33.78 |
| front principal position | 45.96 |
| back principal position | −12.81 |

Unit: mm zoom lens unit data

| Unit | starting plane | focal length | lens overall length | FPP | BPP |
|---|---|---|---|---|---|
| 1 | 1 | 52.50 | 48.80 | 45.96 | −12.81 | single lens data

| lens | starting plane | focal length |
|---|---|---|
| 1 | 1 | 86.53 |
| 2 | 5 | 68.99 |
| 3 | 7 | −39.78 |
| 4 | 10 | −22.52 |
| 5 | 11 | 44.06 |
| 6 | 13 | 56.44 |
| 7 | 16 | 73.53 |

Numerical Example 3

Unit: mm

Surface data

| Surface No. | r | d | nd | vd | effective diameter |
|---|---|---|---|---|---|
| 1 | 104.460 | 9.00 | 1.48749 | 70.2 | 67.53 |
| 2 | −300.232 | 0.50 | | | 66.86 |
| 3 | 51.920 | 9.50 | 1.49700 | 81.5 | 59.38 |
| 4 | 243.875 | 3.00 | | | 58.00 |
| 5 | −610.337 | 3.50 | 1.83400 | 37.2 | 57.41 |
| 6 | 93.667 | 2.50 | | | 53.72 |
| 7 | 61.059 | 8.00 | 1.49700 | 81.5 | 52.23 |
| 8 | −583.753 | 0.50 | | | 51.39 |
| 9 | 29.125 | 3.20 | 1.71736 | 29.5 | 42.31 |
| 10 | 24.344 | 12.50 | | | 38.01 |
| 11(diaphragm) | ∞ | (variable) | | | 35.56 |
| 12 | −1837.096 | 4.50 | 1.84666 | 23.9 | 33.81 |
| 13 | −55.859 | 2.00 | 1.72000 | 50.2 | 33.05 |
| 14 | 41.346 | 4.00 | | | 29.79 |
| 15 | ∞ | 0.10 | | | 29.51 |
| 16 | ∞ | 0.40 | 1.51633 | 64.1 | 29.49 |
| 17 | ∞ | (variable) | | | 29.43 |
| 18 | −31.045 | 2.50 | 1.74077 | 27.8 | 26.05 |
| 19 | 175.679 | 8.50 | 1.77250 | 49.6 | 28.90 |
| 20 | −40.350 | 0.50 | | | 32.19 |
| 21 | 107.611 | 6.00 | 1.83400 | 37.2 | 35.44 |
| 22 | −183.700 | (variable) | | | 36.03 |
| image plane | ∞ | | | | | various data

| | |
|---|---|
| zooming ratio | 1.00 |
| focal length | 133.50 |
| Fno | 2.06 |
| angle of view | 9.21 |
| image height | 21.64 |
| lens overall length | 155.41 |
| BF | 54.41 |
| d11 | 2.47 |
| d17 | 17.83 |
| d22 | 54.41 |
| incident pupil position | 74.70 |
| exit pupil position | −91.21 |
| front principal position | 85.82 |
| back principal position | −79.09 |

Unit: mm zoom lens unit data

| Unit | starting plane | focal length | lens overall length | FPP | BPP |
|---|---|---|---|---|---|
| 1 | 1 | 93.66 | 52.20 | −7.82 | −43.87 |
| 2 | 12 | −64.15 | 11.00 | 3.66 | −4.30 |
| 3 | 18 | 81.23 | 17.50 | 17.37 | 10.16 | single lens data

| lens | starting plane | focal length |
|---|---|---|
| 1 | 1 | 160.14 |
| 2 | 3 | 130.58 |
| 3 | 5 | −97.15 |
| 4 | 7 | 111.68 |
| 5 | 9 | −286.91 |
| 6 | 12 | 67.97 |
| 7 | 13 | −32.72 |
| 8 | 16 | 0.00 |
| 9 | 18 | −35.43 |
| 10 | 19 | 43.22 |
| 11 | 21 | 82.14 |

Numerical Example 4

Unit: mm

Surface data

| Surface No. | r | d | nd | vd | effective diameter |
|---|---|---|---|---|---|
| 1 | ∞ | 1.50 | | | 54.03 |
| 2 | 79.773 | 2.00 | 1.60311 | 60.6 | 46.37 |
| 3 | 28.865 | 8.00 | | | 39.23 |
| 4 | 117.212 | 4.00 | 1.77250 | 49.6 | 37.77 |
| 5 | −212.879 | (variable) | | | 36.80 |
| 6 | 84.814 | 1.50 | 1.48749 | 70.2 | 24.71 |
| 7 | 19.679 | 10.00 | | | 21.16 |
| 8 | 22.595 | 3.50 | 1.91082 | 35.3 | 14.46 |
| 9 | −45.147 | 1.00 | 1.73800 | 32.3 | 13.37 |
| 10 | 26.917 | 3.50 | | | 12.87 |
| 11(diaphragm) | ∞ | (variable) | | | 12.80 |
| 12 | 111.141 | 1.50 | 1.72916 | 54.7 | 12.69 |
| 13 | −73.101 | (variable) | | | 12.63 |
| 14 | −13.184 | 1.50 | 1.74000 | 28.3 | 12.65 |
| 15 | −132.829 | 4.50 | 1.69680 | 55.5 | 15.15 |
| 16 | −17.844 | 0.80 | | | 17.62 |
| 17* | −53.671 | 3.20 | 1.58313 | 59.4 | 19.54 |
| 18 | −18.948 | 0.00 | | | 20.58 |
| 19 | ∞ | (variable) | | | 22.26 |
| image plane | ∞ | | | | |

Aspheric data 17-th surface

K = 0.00000e+000 A4 = −2.50000e−005 A6 = 4.20000e−008
A8 = −6.00000e−010 A10 = 2.00000e−012 various data

| | |
|---|---|
| zooming ratio | 1.00 |
| focal length | 28.50 |
| Fno | 2.85 |
| angle of view | 37.20 |
| image height | 21.64 |
| lens overall length | 99.00 |
| BF | 38.00 |
| d5 | 7.00 |
| d11 | 4.00 |

-continued

Unit: mm

| | |
|---|---|
| d13 | 3.50 |
| d19 | 38.00 |
| incident pupil position | 28.63 |
| exit pupil position | −29.20 |
| front principal position | 45.04 |
| back principal position | 9.50 | zoom lens unit data

| Unit | starting plane | focal length | lens overall length | FPP | BPP |
|---|---|---|---|---|---|
| 1 | 1 | −528.68 | 15.50 | −39.98 | −57.63 |
| 2 | 6 | 374.88 | 19.50 | 48.86 | 38.18 |
| 3 | 12 | 60.69 | 1.50 | 0.53 | −0.35 |
| 4 | 14 | 61.47 | 10.00 | 17.07 | 15.27 | single lens data

| lens | starting plane | focal length |
|---|---|---|
| 1 | 1 | −76.12 |
| 2 | 4 | 98.37 |
| 3 | 6 | −52.96 |
| 4 | 8 | 16.95 |
| 5 | 9 | −22.72 |
| 6 | 12 | 60.69 |
| 7 | 14 | −19.88 |
| 8 | 15 | 29.12 |
| 9 | 17 | 48.58 |

Table 1 summarizes numerical values corresponding to transmittance T(0.5) located at a position with a distance from the center of the transmittance distribution element in the radial direction which is 50% of the effective diameter of the transmittance distribution element. Table 2 summarizes numerical values corresponding to the conditional expressions (2) to (5) in each numerical examples. Table 3 summarizes numerical values corresponding to the upper limit value and the lower limit value of the conditional expression (3).

TABLE 1

| | Numerical Example 1 | Numerical Example 2 | Numerical Example 3 | Numerical Example 4 |
|---|---|---|---|---|
| T(0.5) | 0.91 | 0.98 | 0.93 | 0.98 |

TABLE 2

| | Numerical Example 1 | Numerical Example 2 | Numerical Example 3 | Numerical Example 4 |
|---|---|---|---|---|
| Conditional Expression (2) | 0.51 | 0.66 | 0.53 | 0.63 |
| Conditional Expression (3) | 0.65 | 0.85 | 0.70 | 0.80 |
| Conditional Expression (4) | 35.4 | 35.2 | 64.8 | 10.0 |
| Conditional Expression (5) | 22.4 | 22.4 | 9.2 | 37.2 |

TABLE 3

| | Num. Ex. 1 | Numerical Example 2 | | Num. Ex. 3 | Numerical Example 4 | |
|---|---|---|---|---|---|---|
| | F1 | F1 | F2 | F1 | F1 | F2 |
| $OP1/r_a$ | 0.77 | 1.00 | 1.00 | 0.87 | 0.99 | 1.00 |
| $OP2/r_a$ | 0.31 | 0.34 | 1.00 | 0.49 | 0.16 | 0.97 |
| $OP3/r_a$ | 0.35 | 1.00 | 0.43 | 0.46 | 1.00 | 0.26 |
| $(OP2 + OP3)/2r_a$ | 0.33 | 0.67 | 0.72 | 0.48 | 0.58 | 0.62 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-021965, filed Feb. 6, 2015, which is hereby incorporated by reference herein in its entirety.

What is claimed is:

1. An optical system comprising:
   a plurality of lenses;
   a diaphragm configured to adjust a light amount; and
   an optical element having a transmittance distribution,
   wherein a transmittance of the optical element decreases as a distance increases from an optical axis of the optical element in a radial direction in a range of $r_1 < r$, and the following conditional expressions are satisfied in a range of $0.9 \leq T(r)/T_0$; and $0.5 \leq r_1/r_a$, where r is a distance in the radial direction from the optical axis, $r_1$ is a distance in the radial direction from the optical axis to a position at which the transmittance of the optical element has a value of 90% of a maximum value, T(r) is the transmittance at a position having the distance r, $T_0$ is the maximum value of the transmittance, and $r_a$ is an effective diameter of the optical element, and
   wherein the following conditional expression is satisfied:

$(OP2+OP3)/2r_a \leq r_2/r_a \leq OP1/r_a$ where the diaphragm is fully opened, $r_2$ is a distance in the radial direction from the optical axis to a position at which the transmittance of the optical element has a value of 50% of the maximum value, P1 is an end point in an incident area of a most off-axis light flux in the optical element, P2 is a top end of the incident area, P3 is a bottom end of the incident area, and OPi is a distance between the optical axis and a point corresponding to Pi (i=1, 2, 3) projected onto a plane perpendicular to the optical axis.

2. The optical system according to claim 1, wherein in focusing on infinity, the following conditional expression is satisfied:

$10 \text{ mm} \leq f/Fno \leq 70 \text{ mm}$ where f is a focal length of the optical system, and Fno is an open aperture value.

3. The optical system according to claim 1, wherein the following conditional expression is satisfied:

$9° \leq \omega \leq 45°$ (5)

where ω is half an angle of view of the optical system.

4. The optical system according to claim 1, wherein the following conditional expression is satisfied:

$\{(T\text{max}-T\text{min})/T\text{max}\} \times 100(\%) \leq 20(\%)$ where Tmax is the maximum value of the transmittance and Tmin is a minimum value of the transmittance in a wavelength range from 430 nm to 700 nm.

5. The optical system according to claim 1, wherein the optical element is disposed near the diaphragm.

6. The optical system according to claim 1, wherein two optical elements are disposed before and after the diaphragm.

7. An optical apparatus comprising an optical system, wherein the optical system includes:
a plurality of lenses;
a diaphragm configured to adjust a light amount; and
an optical element having a transmittance distribution, wherein a transmittance of the optical element decreases as a distance increases from an optical axis of the optical element in a radial direction in a range of $r_1 < r$, and the following conditional expressions are satisfied in a range of $0.9 \leq T(r)/T_0$; and $0.5 \leq r_1/r_a$, where r is a distance in the radial direction from the optical axis, $r_1$ is a distance in the radial direction from the optical axis to a position at which the transmittance of the optical element has a value of 90% of a maximum value, $T(r)$ is the transmittance at a position having the distance r, $T_0$ is the maximum value of the transmittance, and $r_a$ is an effective diameter of the optical element, and wherein the following conditional expression is satisfied:

$(OP2+OP3)/2r_a \leq r_2/r_a \leq OP1/r_a$ where the diaphragm is fully opened, $r_2$ is a distance in the radial direction from the optical axis to a position at which the transmittance of the optical element has a value of 50% of the maximum value, P1 is an end point in an incident area of a most off-axis light flux in the optical element, P2 is a top end of the incident area, P3 is a bottom end of the incident area, and OPi is a distance between the optical axis and a point corresponding to Pi (i=1, 2, 3) projected onto a plane perpendicular to the optical axis.

* * * * *